FIG. 1.
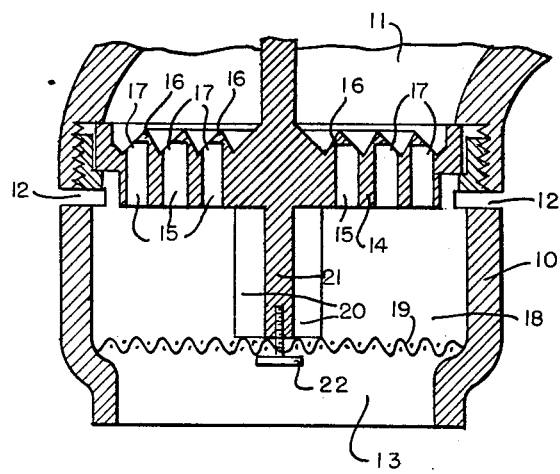
FIG. 1A.
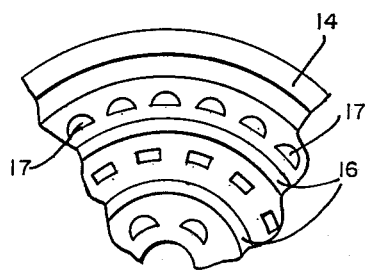
FIG. 1B.
FIG. 2.
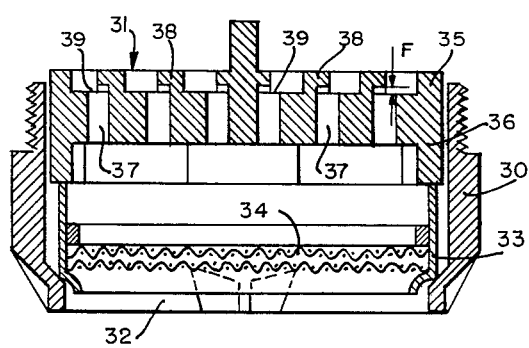
FIG. 1C.
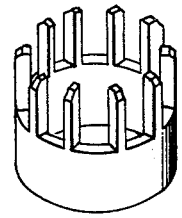
FIG. 2A.
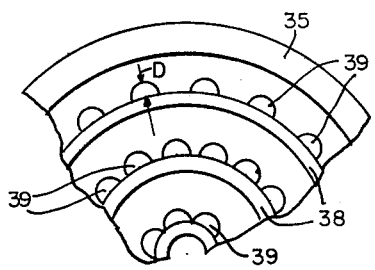
FIG. 2B.
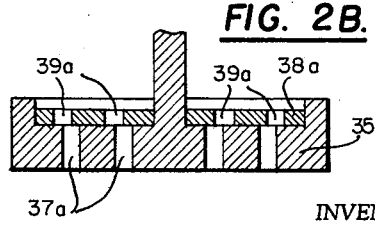
INVENTOR
Elie P. Aghnides
BY Moore & Hall.
ATTORNEYS

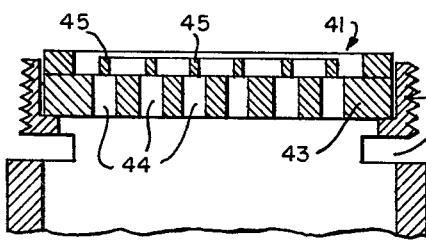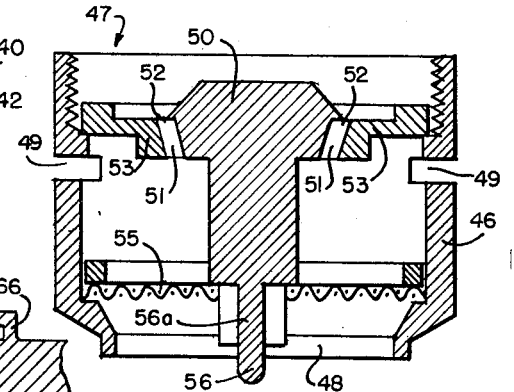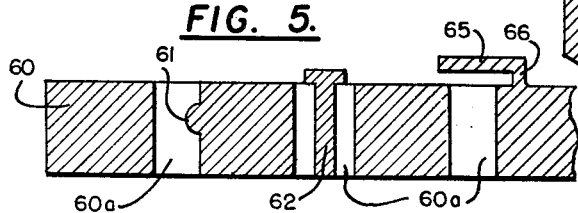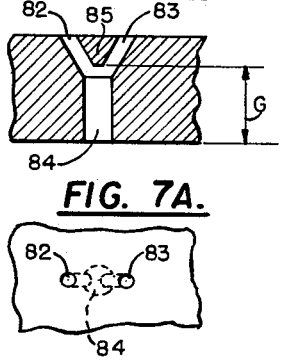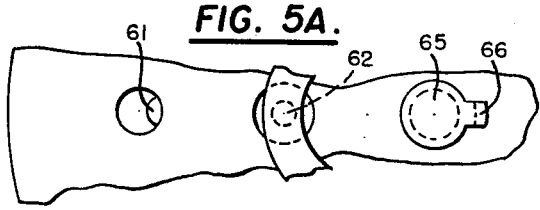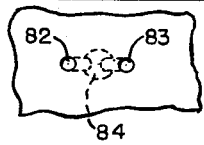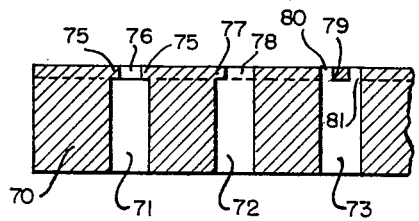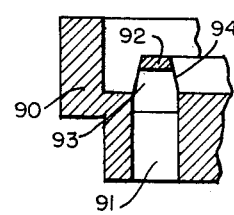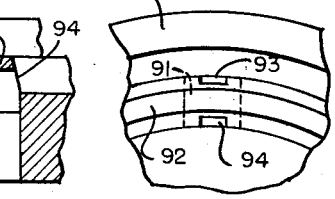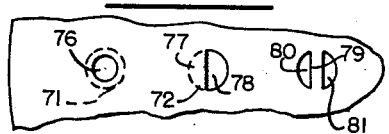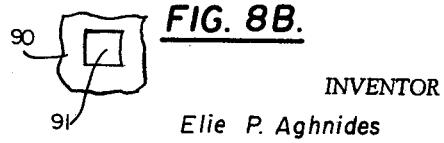

United States Patent Office 3,130,917
Patented Apr. 28, 1964

3,130,917
WATER AERATOR HAVING IMPROVED
PRE-AERATING DISC
Elie P. Aghnides, 46 W. 54th St., New York 19, N.Y.
Filed Aug. 14, 1961, Ser. No. 131,413
16 Claims. (Cl. 239—427)

This invention relates to water aerating devices and particularly to such devices of the general kind disclosed in my prior copending application Serial Number 640,859 filed February 18, 1957, entitled "Water Aerator," now U.S. Patent No. 2,998,929, granted September 5, 1961. This application is intended to claim certain of the specie of the generic invention of the aforesaid prior application which were disclosed and covered by the generic claims of said prior case but not made the subject of specific claims therein, and it is also intended to cover certain improvements upon the subject matter of the aforesaid prior application.

While there are other uses for the invention, the primary use is in combination with aerating screens so that the water from a faucet is converted into a coherent jet laden with numerous small bubbles. One feature of the aforesaid prior patent is that its upstream disc not only produces high velocity jets of water but also pre-aerates those jets whereby when the jets strike the downstream screens the required amount of aeration is achieved with less screen resistance than heretofore was required. As a result the aerator is lower in cost as well as more efficient.

The aforesaid upstream disc is preferably manufactured by a molding process whereby it can be produced in very large quantities at a very low cost. One of the features claimed in this application is an improved upstream disc which can be molded more efficiently and effectively; and which after it has been molded, performs its aerating function in an improved way.

An object of this invention is to provide a molding procedure or method which is an improvement over that heretofore employed.

Other objects of the invention include provision of an improved upstream disc and an aerator embodying such disc. Still other objects of the invention will appear as this discription proceeds.

In carrying out the invention in its preferred form, the upstream disc is molded out of a material such as polyethylene. That material is selected because it is resistant to calcium deposits which have been found to form upon metal and rubber parts of an aerator. In molding the aerator disc of polyethylene, it is desirable to reduce so-called "flash," and in my application Serial No. 831,588, filed August 4, 1959, entitled "Faucet Aerators," now U.S. Patent No. 2,998,931 granted September 5, 1961, I have disclosed an aerator disc and a method of making the same which avoids "flash." This application is a continuation-in-part of that application. The preferred form of the invention claimed in that application embodies a disc made by the process of having a piston enter a groove between two ribs, and the sliding contact of the piston with the remaining part of the mold provides a sliding contact which eliminates "flash" and provides the intended orifice without burrs or other obstructions. However, it has been found desirable to provide a molding procedure in which the piston has a steady contact with the remainder of the mold instead of the aforesaid sliding contact, and I have provided an aerator disc which is capable of being manufactured by the "steady contact" method. This method prevents erosion of the part of the mold molding the entrance orifice, thus facilitating mold-maintenance and avoids burrs which would result when erosion of the said part of the mold takes place.

In order to provide the aforesaid steady contact, the upstream end of the orifice in the disc is slanted or tapered so that no part of the piston of the mold will extend out of the aerator disc during molding.

Other forms of the invention described but not specifically claimed in my aforesaid prior application Serial No. 640,859 are also hereinafter described and claimed.

In the drawings:

FIGURE 1 is a cross-sectional view of one form of the invention.

FIGURE 1A is a top view of the disc of FIGURE 1.

FIGURE 1B is a bottom view of the disc of FIGURE 1.

FIGURE 1C is a perspective view of part of the piston employed in molding the disc of FIGURE 1.

FIGURE 2 is a cross-sectional view of another form of the invention.

FIGURE 2A is a top view of the disc of FIGURE 2.

FIGURE 2B is a cross-sectional view of a modified form of the invention.

FIGURE 3 is a cross-sectional view of a further modified form of the invention.

FIGURE 4 is a cross-sectional view of still another form of the invention.

FIGURE 5 is a cross-sectional view of a disc constituting a further modified form of the invention.

FIGURE 5A is a top view of FIGURE 5.

FIGURE 6 is a cross-sectional view of another disc showing other modified forms of the invention.

FIGURE 6A is a top view of FIGURE 6.

FIGURE 7 is a cross-sectional view of a further modified form of the invention.

FIGURE 7A is a top view of FIGURE 7.

FIGURE 8 is a cross-sectional view of a still further modified form of the invention.

FIGURE 8A is a top view of FIGURE 8.

FIGURE 8B is a partial bottom view of FIGURE 8.

Various structures will be suggested to those skilled in the art operating generally in the manner described. In particular, and referring to FIGURE 1, it will be seen that an improved water aerator constructed in accordance with the present invention may comprise a casing 10 having a water inlet 11 at one end thereof, and further including air inlets 12 and a jet output 13. Disposed within the casing is an improved diaphragm structure 14, constructed in accordance with the present invention; and in particular, this diaphragm structure includes a plurality of elongated substantially tubular chambers 15 therein. The upstream end of the diaphragm 14 has a corrugated configuration; and in particular, defines a plurality of walls 16 which are inclined at approximately 45 degrees to the horizontal, with each of the walls 16 intersecting a portion of the upper end of each chamber 15, thereby to form a plurality of restricted openings 17.

Each of the entrance openings is, as illustrated in FIGURE 1, inclined at substantially 45 degrees to the horizontal; but it will be appreciated that this angle is not critical, and is merely selected to give the edges of the orifices a desired thickness. The water forced through the several openings 17 and chambers 15 is given such turbulence that the issuing streamlets have impaired coherence. The height of the chambers 15 will determine to some degree the angle (with respect to the vertical) at which the issuing streamlets emerge. The streamlets may be made to slightly converge, or in the alternative to diverge, if desired, by modifying the height of the chambers. Air entering through inlets 12 may accordingly pass into a main aerator chamber 18; and this air will therefore be carried along by the said issuing streamlets of impaired coherence, which streamlets pass through the aforementioned main chamber 18 onto a screen (or screens) such as 19, and the output is a highly aerated soft bubbly stream of water.

In the particular example shown in FIGURE 1, the structure 14 includes a plurality of webs 20 arranged about a central post 21; and this structure 20—21 cooperates with a pin 22 for holding the screen 19 in place substantially transverse to the direction of fluid flowing through the casing 10. It will be appreciated that the overall structure on the interior of casing 10 may, therefore, be readily removed by merely unscrewing casing 10 from a water tap or the like, and thereafter lifting the interior structure from the said casing.

In actual practice, a structure of the type shown in FIGURE 1 may have the following dimensions: the disc or diaphragm structure 14 may have twenty-nine openings 17, each of which is as shown in FIGURE 1A, equivalent to a round opening having a diameter of approximately 0.75 mm. The several openings 17 communicate with tubular chambers 15, each of which has a diameter of 1 mm., and a height of approximately 3.5 mm. A disc or member, the same in all respects as the one just described, but having holes of a height of only 2.5 mm. gave comparable results. On an average domestic water faucet when the static water pressure was forty-seven pounds, these two discs created back pressures of thirty pounds, and twenty-seven pounds, respectively. When the restricted entrances 17 were omitted, the twenty-nine chambers 15, of 1 mm. diameter each, created a back pressure of twenty pounds. Two wire mesh screens similar to screen 19 may be located approximately 10 mm. downstream of the diaphragm of structure 14, and the said screen may have, for instance, a diameter of 21 mm., and may comprise a screen mesh having forty wires per inch and a wire diameter of 0.009 inch. The discharge opening 13 of casing 10 may have a diameter of 16.5 mm. The structures 14, 20 and 21 may be of metal or may comprise a molded plastic material. If the plastic material employed is sufficiently soft it will directly seal the uppermost portion of the casing 10 to the faucet thereby obviating the necessity of providing a separate washer.

It will be appreciated that the particular body 14 described in reference to FIGURE 1 is unitary in nature. A similar body may, however, take the form of composite or separable parts, thereby facilitating construction in some cases.

The bottom of the holes of the disc are shown in FIGURE 1B. The middle row of holes is approximately orthogonal in cross-section and the other rows are shown round simply to illustrate that the holes may be of any suitable shape. As shown, some of the holes may be round and others orthogonal. Preferably the holes are of the latter type as that permits better molding.

In manufacturing the disc 14 of FIGURE 1, the chambers 15 are formed by square pins on the piston of the mold and these pins are tapered at their upper ends to provide for the slanting inlet openings 17 of FIGURE 1. The result is that the slanted or tapered portions of the upper ends of the pins of the piston maintain steady contact with the remainder of the mold, as distinguished from the sliding contact in the case of some of the forms disclosed in my aforesaid prior application Serial No. 831,588. There would be a dented cylinder like the one shown in FIGURE 1C for each circular row of holes to mold the disc of FIGURE 1 with holes having orthogonal cross-section.

Another form, constructed in accordance with the present invention, is shown in FIGURE 2. The structure shown in FIGURES 2 and 2A again takes the form of a casing 30 having a water inlet end 31 and a jet outlet end 32; and the said casing contains therein a cylindrical supporting structure 33 carrying a plurality of screens 34. Slots such as 12 (FIGURE 1) may be dispensed with by this construction, and air is caused to enter along paths adjacent the discharge end of the casing 30, whereby the said air passes intermediate the outer wall of shell 33 and the inner walls of casing 30. An improved aerator similar to that already described in reference to FIGURE 1 is provided; and in particular, this structure comprises a disc or partition-like member 35 having a plurality of legs 36 depending therefrom in spaced relation to one another. The said member 35 further includes a plurality of elongated substantially tubular chambers 37 therein; and air passing upward between shell 33 and the interior surfaces of casing 30 may therefore pass between the several legs 36 and enter adjacent the downstream end of each of chambers 37. Body 35 includes, adjacent its upstream end, a plurality of ring-like projections 38 which partially overlie the upstream end of each of tubular chambers 37. As a result of this configuration, therefore, a plurality of restricted openings 39 are formed adjacent the upstream end of each of chambers 37 whereby, as was the case in the example of FIGURE 1, streamlets of water passing through said openings 39 and chambers 37, discharge with substantial velocity as streamlets having impaired coherence, being of whitish character and carrying along considerable amounts of air, so that when said streamlets strike screen 34, a large volume of air is mixed with the water and the output is a soft highly aerated stream of water.

In actual practice, the body 35 may include three substantially concentric rows of openings 39, and the ring-like projections 38 may be so disposed that they partially close the inlet ends of each tubular chamber 37. The several chambers 37 may have a diameter of approximately 1 mm., the distance D shown in FIGURE 2A may be 0.50 mm. or 0.75 mm. and a height of approximately 3.5 mm., and when these dimensions are chosen member 35 gives results comparable to those of member or diaphragm 14 in FIGURE 1. At a static water pressure of 47 pounds, a disc or member 35, as shown in FIGURE 2, with twenty-nine holes 37 that are of 1 mm. diameter and 3.5 mm. long, created a back pressure of 20 pounds. When projections 38 were added, leaving an entrance opening where distance D (FIGURE 2A) measured 0.5 mm., the back pressure created was 32 pounds; whereas when distance D measured 0.75 mm. the back pressure created was 24 pounds. Both discs or members produced the desired streamlets of impaired coherence like the one specified in connection with FIGURE 1.

Again, as was the case with respect to the structure of FIGURE 1, the device of FIGURE 2 may be made in plural parts rather than being formed as a unitary structure. In particular, as shown in FIGURE 2B, body 35a may be formed with a plurality of elongated chambers 37a extending through the body. A disc member 38a may thereafter be placed over the upstream end of body 35a, and the said member 38a may include a plurality of openings 39a displaced from the elongated axes of the several tubular chambers 37a. As will be seen from an examination of FIGURE 2B, the displaced relation between openings 39a and tubular chambers 37a acts as before to partially close or restrict the uppermost ends of each of the said chambers 37a, whereby the resulting configuration is substantially the same as that already described in reference to FIGURE 2.

Another embodiment of the present invention is shown in FIGURE 3; and in particular, this form of the invention may once more comprise a casing 40 having a water inlet 41 and an air inlet 42, the said casing being adapted to support a disc, partition, or body 43 therein. In this particular embodiment of the invention, the said body 43 again defines a plurality of tubular chambers 44 extending therethrough, and further defines a plurality of ring-like projections 45 disposed to close the middle portions of each upstream end of tubular chambers 44. As a result, water enters the chamber 44 from both sides of each ring-like projection 45, is therein given turbulence and issues in the form of streamlets having impaired coherence, as previously described.

Still another embodiment of the invention is shown in FIGURE 4, and once more, a casing 46 may be provided having a water inlet 47, a jet outlet 48 and air inlets 49 therein. The particular aerator shown in FIGURE 4 further includes a member 50 extending transverse to the direction of fluid flow therethrough. The said member 50 is provided with webs 51. Body 50 is adapted to be inserted into a ring 53, whereby the several webs 51 cooperate with the inner surface of ring 53 to form a plurality of elongated passages or chambers therebetween, with each of the said passages including a restricted entrance opening such as 52 adjacent the upper end thereof and inclined at an angle thereto. To converge or diverge the whitish streamlets so as to better distribute their impact over screen 55, the height of every other chamber could be made bigger than the others, if desired.

The casing 46 further includes one or more screens, such as 55, therein; and body 50 includes an elongated handle 56 depending therefrom and extending through the said screen 55. Webs 56a running along handle 56 serve as guides. As a result of this particular structure, the body 50 may be raised out of the ring 53 by pushing upward on handle 56, whereby the space between body 50 and ring 53 is substantially enlarged, thereby to permit the interior of the aerator to be flushed or cleaned without removing the aerator from a water tap or the like.

Still another form of the present invention is shown in FIGURES 5 and 5A. In particular, these figures illustrate a portion of a disc, partition or diaphragm structure capable of being inserted into an aerator casing in a manner similar to that already described in reference to FIGURES 1 through 4, with the exception that the disposition of chambers and openings differs somewhat from that already described. Member 60 shows two passageways having a tubular shape, and which are representative of many other similar passageways in member 60. Interior projections 61 and 62 are intermediate the inlet and outlet openings. It is understood that member 60 could embody passageways having only the suitable number of projections 61, or in the alternative only projections 62. Member 60 shows a third passageway 60a which could have round or orthogonal cross-section and is located under a lid 65 connected to member 64 by a leg 66.

FIGURES 6 and 6A illustrate, in partial cross-section, other forms of openings which may be constructed in accordance with the present invention; and these figures are particularly illustrative of structures having plural different types of openings therein. Thus, referring to FIGURE 6, it will be seen that as was the case in FIGURES 1 through 5, an improved structure may take the form of a disc or partition member 70 adapted for insertion into an aerator; and the said member 70 includes a plurality of elongated substantially tubular chambers 71, 72, 73, etc., therein. The member 70 includes portions 75 overlying the uppermost end of chamber 71, whereby a restricted opening 76 is formed which is substantially coaxial with the elongated chamber 71.

Member 70 also includes portion 77 extending over a portion of the uppermost end of chamber 72, thereby to close off a portion of the upper end of chamber 72 in a manner similar to that already described in reference to FIGURE 2. This structure again provides a restricted opening 78 adjacent the uppermost end of chamber 72.

While FIGURE 6 shows a disc with three different forms of passageways, it is understood that these three different forms are illustrative. While all three different forms could be used on one disc as shown, it is understood that a disc of twenty-nine (more or less) holes could be made with any one of the three forms of passageways or with any combination of such forms of passageways.

FIGURES 6 and 6A also show a further modified form of inlet opening embodying a ring of round holes 73 each of which is partly covered by a central obstruction 79 providing restricted inlets 80 and 81 between it and sidewalls of the opening 73. As shown in FIGURE 6A, the obstruction 79 is molded integrally with the disc and it provides two partially circular openings 80 and 81 on either side thereof.

In FIGURE 7, there is shown a cross-section of a disc similar to that of the other figures and one orifice 84 is disclosed—it being understood that a great many similar orifices would be located in the disc. This orifice includes two circular entrance openings 82 and 83 which are separated from each other by part 85 of the molded disc. In a typical structure capable of producing the desired results, the distance G may be 10.25 millimeters; each opening 82, and 83 may be 2.0 millimeters in diameter; the main chamber 84 is 2.8 millimeters in diameter; and the length of the vertical part of chamber 84 may be 8.0 millimeters. The maximum vertical height of part 85 may be 3.0 millimeters. The water streams entering inlets 82 and 83 strike each other and thereby create turbulence in the water that flows through chamber 84. The water discharged from chamber 84 has impaired coherence and is swollen as compared to the cross-section of the chamber.

FIGURES 8, 8A, and 8B illustrate the preferred form of my invention. The disc 90 has a large number of pre-aerating openings such as 91—92. In the specimen or sample opening 91—92 shown, the main opening 91 is covered by a bridge 92 of smaller cross-section than the opening. Moreover the bridge 92 has its side walls slanting downwardly and outwardly. The reason that bridge 92 has smaller cross-section than hole 91 and also has slanting side walls is to facilitate molding. The piston of the mold, used in the manufacture of FIGURE 8, will have its upper end tapered along the lines 94 and will make a steady contact with its complementary part of the mold. Since this contact is a firm contact under pressure, rather than mere touching, the molding difficulties are overcome and the molded articles may be produced in large quantities without danger of "flashing" or the leaving of burrs or other imperfections.

It is further understood that in all forms of the invention (all of the figures of the drawings) the inlet openings (17, 39, 39a, 45, 52, 61, 62, 76, 78, 80, 81, 82, 83, and 94) are large enough to largely fill the chambers (15, 37, 37a, 44, 51, 60a, 71, 72, 73, 84 and 91) with water. The downstream ends of all of the chambers are exposed to air, and the water in these chambers is turbulent due to the character of the inlet opening. This turbulent water has the property of picking up large amounts of air, whereby the jets discharged by the molded disc are pre-aerated before they reach the mixing screens. Such pre-aeration means that less screen resistance is required in order to give the desired mixing action.

In all forms of the invention the number of holes shown is purely for purpose of illustration. For example, while only one hole like 60a—62 is shown in FIGURE 5, it is understood that in this and all other figures, that there would preferably be many holes of each particular type.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim to have invented:

1. A device for producing an aerated jet of water comprising a disc, means for supplying water under pressure to a first side of the disc, a chamber extending upstreamwardly from the second side of the disc, and a member having an inclined surface disposed adjacent the first side of the disc to form a slanted restricted opening leading into said chamber for largely filling it with water.

2. A device as defined in claim 1 in which said inclined member forms only one opening at the upstream end of said chamber.

3. A device as defined in claim 1 in which each chamber has two openings at its upstream end formed by a tapered bridge of smaller cross-section than the chamber.

4. A device as defined in claim 3 in which said bridge is positioned above the upstream end of said chamber, said bridge being so tapered that its cross-section becomes larger as it approaches the chamber.

5. A water aerating device comprising a plate, means for applying water under pressure to the upstream side of the plate, said plate having elongated holes extending therethrough, and a protuberance disposed within said holes adjacent their upstream ends to provide restricted portions within said holes.

6. A water aerating device comprising a plate having a plurality of holes each with a protrusion therein extending inwardly from the sidewall thereof, means for applying water under pressure to the upstream side of the plate, the downstream side of the plate being exposed to air.

7. A device as defined in claim 6 in which the upstream surface of said plate is flat in the area where said holes lie, said holes being cylindrical, each said protrusion extending into its respective hole a distance not exceeding one half the diameter of said hole and having a length along said hole not exceeding the diameter of said hole.

8. A device as defined in claim 7 in which the upstream side of said protrusion lies on a plane defining the upstream side of said plate.

9. A water aerating device comprising a plate having a plurality of holes therein each with a T-shaped member therein, the cross-arm of the T being adjacent the upstream end of the hole to provide a restricted entrance opening, means for applying water under pressure to the upstream side of the plate, the downstream side of the plate being exposed to air.

10. A water aerating device comprising a member having a hole therethrough which has a restricted entrance opening coaxial with the hole, means applying water under pressure to the upstream side of the member to force water to enter the hole through said restricted entrance opening, the downstream side of the member being exposed to air.

11. A water aerator comprising a member having a round hole therein, means applying water under pressure to the upstream side of the member, the downstream side of the member being exposed to air, said hole having a semi-circular restricted inlet opening at its upstream side.

12. A water aerator comprising a member, means applying water under pressure on the upstream side of the member, the downstream side of the member being exposed to air, a chamber extending upward from the downstream end of the member part way through the member, and abutment means extending at least partially into the upstream end of said chamber in spaced relation to sidewalls of said chamber to form plural entrance openings from the upstream side of the member to the chamber for directing plural mutually impinging streams into the upper end of the chamber thus effecting turbulence in the chamber, said entrance openings being large enough to largely fill the chamber with water so that a jet of impaired coherence is discharged from the chamber which jet is swollen as compared to the cross-section of the chamber.

13. A water aerating device comprising a plate, means for applying water under pressure to the upstream side of the plate, said plate having at least one hole therethrough and a lid separably disposed adjacent the upstream end of said hole, means for supporting said lid and holding it in spaced relation with the upstream end of said hole, said lid including a portion extending at least partly beyond the upstream edge of said hole to give turbulence to the water entering said hole.

14. The device of claim 1 wherein said inclined surface is of rounded configuration, said member comprising a protuberance extending inwardly from a side wall of said chamber.

15. The device of claim 2 wherein said inclined surface is mounted for movement relative to said disc thereby to permit the size of said restricted opening to be varied.

16. The device of claim 3 wherein said tapered bridge is disposed substantially entirely within said chamber adjacent the upstream end of said chamber.

References Cited in the file of this patent

UNITED STATES PATENTS

| | | |
|---|---|---|
| 2,899,710 | Hendry | Aug. 18, 1959 |
| 2,956,309 | Herbert | Oct. 18, 1960 |
| 2,998,929 | Aghnides | Sept. 5, 1961 |
| 2,998,931 | Aghnides | Sept. 5, 1961 |